Patented May 19, 1936

2,041,593

UNITED STATES PATENT OFFICE 2,041,593

PROCESS OF HYDROLYZING CHLOR ALKYL PHENOLS

Samuel G. Burroughs, Pittsburgh, Pa., assignor to Pennsylvania Coal Products Company, a corporation of Pennsylvania No Drawing. Application October 11, 1934, Serial No. 747,926

14 Claims. (Cl. 260—154)

This invention is concerned with hydrolysis of chlorine derivatives of the commercial cresoles and xylenols to form their respective dihydroxy compounds, namely the methyl dihydroxy benzenes, and the dimethyl dihydroxy benzenes.

It is well known that compounds of the aforesaid type can be hydrolyzed by heating them with aqueous solutions of alkali metal hydroxides under pressure, with or without copper or copper compounds as catalysts, thereby producing their dihydroxy derivatives. However, when such hydrolysis is attempted in the usual way, there is much decomposition due to oxidation or polymerization of these dihydroxy compounds as soon as formed in the reaction. Consequently the yields of dihydroxy compounds obtainable by the known method are very low.

I have now discovered that the method of hydrolysis in my patent application of even date entitled "Process of hydrolyzing chlor phenols" can be utilized for hydrolyzing the mono chlor derivatives of the commercial cresols and xylenols, and thereby producing the corresponding dihydroxy compounds, otherwise called methyl catechol, methyl hydroquinone, dimethyl catechol, and dimethyl hydroquinone. The process consists essentially of the following steps:

The mono chlor phenol derivative, in this case commercial cresol (cresylic acid) or commercial xylenol, is hydrolyzed by heating the same in a suitable pressure vessel, at a temperature between 100° and 250° C. for from 2 to 36 hours, with an amount of alkali metal hydroxide, oxide or salt equal to 2 to 5 moles to 1 mole of the chlor phenol derivative, sufficient water to dilute the alkali metal hydroxide to a solution of from 5 to 35 per cent concentration, an amount of alkaline earth metal compound (oxide, hydroxide, or salt) equal to from 1 to 2 moles, and a small amount of copper or a copper compound as a catalyst. At the end of this reaction period the chlor derivatives of cresol or xylenol were found to be converted into the corresponding dihydroxy compounds, namely methyl catechol, methyl hydroquinone, dimethyl catechol, and dimethyl hydroquinone, and may be separated from the reaction mixture by methods well known to those skilled in the art.

In order to carry out my method in a practical manner, I have found it advisable, but not necessary, to proceed according to the following:

Example 1

92 grams of mono chlor cresol were made by chlorinating commercial cresylic acid, a mixture of ortho, meta, and para cresols in the known manner, by passing 95 per cent of the theoretical amount of chlorine into the cresylic acid at a temperature of about 15° C., and washing with water to remove hydrogen chloride produced in this reaction and free chlorine. To the chlor cresol prepared as above was added the following:

| | Grams |
|---|---|
| Water | 450 |
| Sodium hydroxide | 102 |
| Strontium hydroxide | 60 |
| Copper sulphate | 1 | and the mixture was placed in an iron pressure vessel and heated for 10 hours at a temperature of around 170° C., preferably with agitation. At the conclusion of this heating, the vessel was allowed to cool and the reaction mixture was removed and acidified with 50 per cent sulphuric acid. The acidified mixture was steam distilled, and the oil which steam distilled was separated from the water distillate. The oil thus obtained was distilled to a temperature of 210° C., to remove unchanged cresols. The balance of the oil was then distilled in vacuo. By this means 55 grams of oil was obtained which was free from cresols and chlor cresols, and which gave the well known reactions of methyl catechol, and methyl hydroquinone. The yield of the combined isomers was 72 per cent of the theory.

Example 2

95 grams of mono chlor xylenol were produced by chlorinating commercial xylenol, which contains a mixture of the several isomers, as in Example 1, with 95 per cent of the theoretical amount of chlorine at about 15° C. To the mixture of mono chlor xylenols thus prepared was added 450 grams of water, 102 grams of sodium hydroxide, 60 grams of calcium hydroxide, and 1 gram of copper sulphate, and the mixture was heated to about 170° C. for 10 hours, preferably with agitation in a pressure vessel. About 5 grams of sodium sulphide was added to the reaction mixture after cooling and after having been removed from the reactor, and the mixture was acidified with 50 per cent sulphuric acid. The whole mass was then steam distilled. The oil obtained was separated, and then distilled to 230° C., whereby 5 grams of unconverted xylenol was obtained. The residue was distilled in vacuo, and there was obtained 51 grams (60 per cent of theory) of an oil which was free from chlor compounds and whose properties proved that it consisted mainly of the dimethyl dihydroxy benzenes, especially dimethyl catechol and dimethyl hydroquinone.

Although in carrying out my method, it is advisable to proceed as outlined in the above examples, it is not necessary to do so in order to keep within the scope of my invention. The amount and strength of the alkali metal hydroxide may be varied and the temperature and time altered accordingly. The use of copper or copper compounds as catalysts may be dispensed with, for without such catalysts the reaction will proceed, but at a slower rate. The alkaline earth metal compound used may be any compound whose metal component is classified in the alkaline earth group, the most important of which are calcium, strontium, and magnesium, and whose other radical may be oxide, hydroxide, or any radical producing the oxide or hydroxide under the conditions of the reaction. The purpose of the alkaline earth compound is to stabilize the dihydroxy methyl or dihydroxy dimethyl benzols, by the formation of stable molecular compounds or salts with the same. It was found that all compounds of the above classification, exerted a stabilizing influence of the same degree of effectiveness. Also, in place of sodium hydroxide, potassium hydroxide, or alkaline salts may be used as the hydrolyzing reagent. It is evident from the nature of the commercial cresols or xylenols used in my process that the actual chemical constitution of the products obtained by my method must vary according to the proportions of the various isomers contained in the material treated. Thus, in the case of the cresols, a preponderance of the ortho isomer caused the formation of more methyl hydroquinone; while on the other hand, an increase in the para cresol content caused a gain in the methyl catechol content. The material obtained by my process also contained impurities in small amounts which caused the isomers to be difficult to separate. However, all the different materials made by my process were found to be effective as inhibitors for gasoline and oils.

What I claim is:

1. The process of preparing alkyl derivatives of the dihydroxy benzenes which consists in hydrolyzing the corresponding mono chlor alkyl phenols at a temperature between 100 and 250° C. in the presence of a hydrolytic catalyst with 2 to 5 molecular equivalents of a 5 to 35 per cent aqueous alkali metal compound solution to which has been added 1 to 2 molecular equivalents of an alkaline earth metal compound, said compounds lying in the group consisting of the oxides, hydroxides and salts.

2. The process of preparing alkyl derivatives of the dihydroxy benzenes which consists in hydrolyzing the corresponding mono chlor alkyl phenols at a temperature between 100 and 250° C. for from 2 to 36 hours in the presence of a copper catalyst with an aqueous alkali metal compound solution to which has been added 1 to 2 molecular equivalents of an alkaline earth metal compound to secure a reaction mixture containing alkyl derivatives of the dihydroxy benzenes, acidifying, steam distilling, separating the oil containing alkyl derivatives of the dihydroxy benzenes, and further distilling this oil for its purification, said compounds lying in the group consisting of the oxides, hydroxides and salts.

3. The process of preparing methyl dihydroxy benzenes which consists in hydrolyzing mono chlor cresol derivatives at a temperature between 100 and 250° C. in the presence of a hydrolytic catalyst with 2 to 5 molecular equivalents of a 5 to 35 per cent aqueous alkali metal compound solution to which has been added 1 to 2 molecular equivalents of an alkaline earth metal compound, said compounds lying in the group consisting of the oxides, hydroxides and salts.

4. The process of preparing methyl dihydroxy benzenes which consists in hydrolyzing mono chlor cresol derivatives at a temperature between 100 and 250° C. in the presence of a hydrolytic catalyst with 2 to 5 molecular equivalents of 5 to 35 per cent sodium hydroxide solution to which has been added 1 to 2 molecular equivalents of alkali earth metal compound lying in the classes of oxides, hydroxides and salts.

5. The process of preparing methyl dihydroxy benzenes which consists in hydrolyzing mono chlor cresol derivatives at a temperature between 100 and 250° C. in the presence of a hydrolytic catalyst with 2 to 5 molecular equivalents of 5 to 35 per cent sodium hydroxide solution to which has been added 1 to 2 molecular equivalents of strontium hydroxide.

6. The process of preparing dimethyl dihydroxy benzenes which consists in hydrolyzing mono chlor xylenol at a temperature between 100 and 250° C. in the presence of a hydrolytic catalyst with 2 to 5 molecular equivalents of a 5 to 35 per cent aqueous alkali metal compound solution to which has been added 1 to 2 molecular equivalents of an alkaline earth metal compound, said compounds lying in the group consisting of the oxides, hydroxides and salts.

7. The process of preparing dimethyl dihydroxy benzenes which consists in hydrolyzing mono chlor xylenol at a temperature between 100 and 250° C. in the presence of a hydrolytic catalyst of a 5 to 35 per cent sodium hydroxide solution to which has been added 1 to 2 molecular equivalents of alkali earth metal compound lying in the classes of oxides, hydroxides and salts.

8. The process of preparing dimethyl dihydroxy benzenes which consists in hydrolyzing mono chlor xylenol at a temperature between 100 and 250° C. in the presence of a hydrolytic catalyst with 2 to 5 molecular equivalents of a 5 to 35 per cent sodium hydroxide solution to which has been added 1 to 2 molecular equivalents of strontium hydroxide.

9. The process of preparing an alkyl derivative of a dihydroxy benzene, comprising hydrolyzing the corresponding chlor alkyl phenol at a temperature of 100 to 250° C. by mixing about 92 to 95 grams of said chlor alkyl phenol with about 102 grams of an alkali metal compound dissolved in aqueous solution, about 60 grams of an alkaline earth metal compound and about 1 gram of a copper catalyst, and recovering an alkyl dihydroxy benzene from the reaction mixture.

10. The process of preparing an alkyl derivative of a dihydroxy benzene, comprising hydrolyzing the corresponding chlor alkyl phenol at a temperature of 100 to 250° C. by mixing about 92 to 95 grams of said chlor alkyl phenol with about 102 grams of sodium hydroxide dissolved in aqueous solution, about 60 grams of an alkaline earth metal compound and about 1 gram of a copper catalyst, and recovering an alkyl dihydroxy benzene from the reaction mixture.

11. The process of preparing an alkyl derivative of a dihydroxy benzene, comprising hydrolyzing the corresponding chlor alkyl phenol at a temperature of 100 to 250° C. by mixing about 92 to 95 grams of said chlor alkyl phenol with about 102 grams of an alkali metal compound dissolved in aqueous solution, about 60 grams of an alkaline earth metal compound and about 1 gram of a copper sulphate catalyst, and recovering an alkyl dihydroxy benzene from the reaction mixture.

12. The process of preparing an alkyl derivative of a dihydroxy benzene, comprising hydrolyzing the corresponding chlor alkyl phenol at a temperature of 100 to 250° C. by mixing about 92 to 95 grams of said chlor alkyl phenol with about 102 grams of sodium hydroxide dissolved in aqueous solution, about 60 grams of an alkaline earth metal compound and about 1 gram of a copper sulphate catalyst, and recovering an alkyl dihydroxy benzene from the reaction mixture.

13. The process of preparing an alkyl derivative of a dihydroxy benzene comprising hydrolyzing the corresponding chlor alkyl phenol at a temperature about 170° C. for about ten (10) hours by mixing about 92 to 95 grams of said chlor alkyl phenol with about 102 grams of an alkali metal compound dissolved in aqueous solution, about 60 grams of an alkaline earth metal compound and about 1 gram of a copper catalyst, and recovering an alkyl dihydroxy benzene from the reaction mixture.

14. The process comprising hydrolyzing chlor cresol by mixing about 92 grams thereof with about 102 grams of an alkali metal compound dissolved in water, about 60 grams of an alkaline earth metal compound and about 1 gram of a copper catalyst, heating the mixture for about ten (10) hours at a temperature around 170° C., cooling, neutralizing the reaction mixture with 50% sulphuric acid, steam distilling to produce an oil and a water distillate, distilling the oil at about a temperature of about 203° C. to remove unchanged cresols, and distilling in vacuo the balance of the oil to produce methyl catechol and methyl hydroquinone.

SAMUEL G. BURROUGHS.